No. 881,141. PATENTED MAR. 10, 1908.
N. R. NELSON.
DUST PROOF DISK BEARING AND ATTACHMENT.
APPLICATION FILED SEPT. 4, 1906.
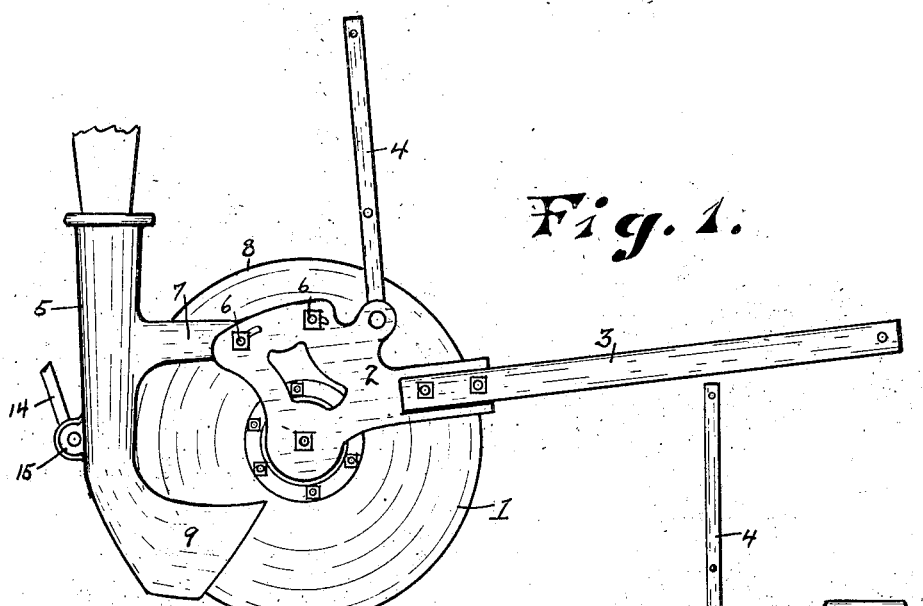
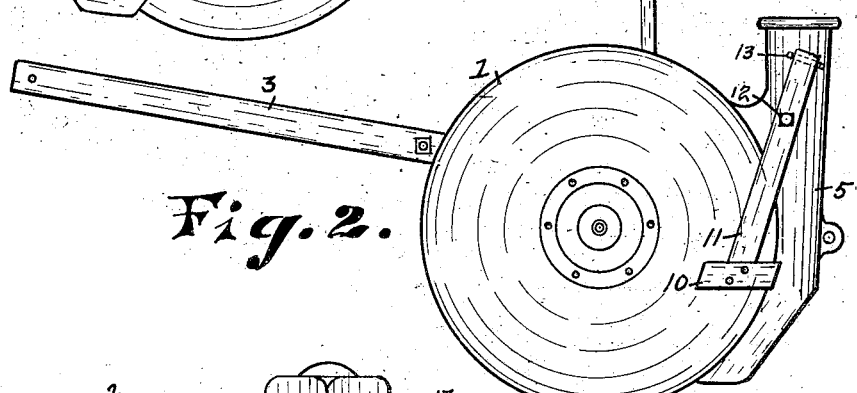
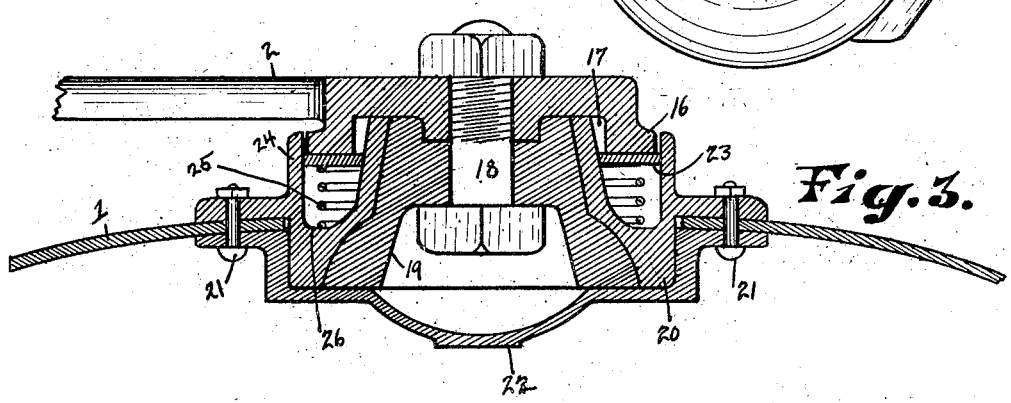
WITNESSES:
INVENTOR
Nicholas R. Nelson
BY
Erwin & Wheeler
ATTORNEYS

UNITED STATES PATENT OFFICE.

NICHOLAS R. NELSON, OF BEAVER DAM, WISCONSIN.

DUST-PROOF DISK BEARING AND ATTACHMENT.

No. 881,141.     Specification of Letters Patent.     Patented March 10, 1908.

Application filed September 4, 1906. Serial No. 333,048.

*To all whom it may concern:*

Be it known that I, NICHOLAS R. NELSON, a citizen of the United States, residing at Beaver Dam, county of Dodge, and State of Wisconsin, have invented new and useful Improvements in Dust-Proof Disk Bearings and Attachments, of which the following is a specification.

My invention relates more especially, first, to the peculiar construction and arrangement of the revoluble and stationary parts of a disk bearing, whereby the same is adapted to more perfectly exclude dust from its contact bearing surfaces, second, to the peculiar construction and arrangement of the disk bearing, the scrapers, the draft mechanism and seed duct of a grain drill, as such parts are adapted to be used in a grain drill.

My invention is further explained by reference to the accompanying drawings in which, Figure 1 is a side view of a disk, draft mechanism and seed duct. Fig. 2 is also a side view of my device from the opposite side to that shown in Fig. 1, and Fig. 3 is a vertical section through the center of a disk bearing and connecting mechanism.

Like parts are identified by the same reference figures throughout the several views.

1 represents the disk blade which is revolubly supported from the bracket 2, and the bracket 2 is adapted to be connected with the draft mechanism of a grain drill, not shown, by a draw bar 3 and suspension bar 4, which parts are connected together by bolts or rivets in the ordinary manner.

5 is a seed duct which is adjustably connected with the bracket 2 by a plurality of bolts 6. The bolts 6 have closely fitting holes in the arm 7 of the duct and elongated apertures 8 in said bracket, whereby the scraper blade 9 which is formed integrally with the seed duct is adapted to be adjusted relatively to the periphery or face of the disk as the conditions of the soil or other conditions may require.

Heretofore it has been common in this class of machines to make the seed duct 5 and bracket bearing 2 in one piece and not adjustable or to locate the disk 1 between the supporting bracket 2 and the seed duct and scraper. By my improvement, however, the bracket and seed duct are both located upon the same side of the disk had the scraper blade 9 is adapted to bear and operate against the convex side of the disk, and an additional scraper blade 10 is yieldingly retained against the opposite concave side of the disk by a resilient bar 11 and the bar 11 is supported from the side of said duct 5 by a bolt 12, while said duct is provided with laterally projecting lugs 13 which engage the respective sides of said bar 11 and coöperate with said bolt 12 in retaining said bar in place. It will be understood that the seed duct 5 is connected with the grain hopper of a grain drill, not shown, through flexible tubes in the ordinary manner.

My invention pertains further more especially to the peculiar construction of the hub mechanism by which the disk blade 1 is revolubly connected with the supporting bracket 2, the primary object of such construction being to so connect such parts that dust will be excluded from the movable bearing surfaces of the same. This desired object is accomplished as hereinafter described.

The bracket 2 is provided with an annular flange 16, annular groove 17 located between the periphery of said flange 16 and the retaining bolt 18. Centrally secured to the vertical face of said bracket is an outwardly diverging collar 19 which is rigidly secured in place with its converging bearing within said groove 17 by said bolt 18, said collar 19 serving as a stationary bearing for the revoluble collar 20 which is nicely fitted thereto. The disk blade 1 is secured to the collar 20 by a plurality of bolts or rivets 21.

22 is a dust cap which covers the joint between the contiguous surfaces of the collars 19 and 20 as well as the outward faces of said sleeves and the sleeve supporting bolt 18, whereby dust is prevented from entering between the bearing surfaces of said sleeves 19 and 20 as well as between the sleeve 19 and the sleeve supporting bolt 18, said dust cap 22 being retained in place by said bolts or rivets 21.

23 is an annular washer which is interposed between the converging end of the sleeve 20 and the annular flange 24 and serves to prevent the admission of dust between said annular flange 24 and the periphery of the flange 16, said washer being retained in place against the face of said flange 16 by the recoil of the spiral spring 25, said spring 25 being interposed between the walls 26 of the collar 20 and said washer, and adapted to take up wear and retain said collar in close contact with the vertical face of said collar 16. Thus it is obvious that the cap 22 serves to prevent the admission of dust between the outer contiguous bearing surfaces of the sleeves 19 and 20, while said washer 23 serves to prevent dust from entering between the inner converging ends of said sleeves.

Having thus described my invention I do not wish to confine or limit the dust excluding mechanism of the disk bearing to its use in connection with grain drills only as the same is equally adapted to be used with the colters of plows or in connection with so-called disk harrows and for wagon axles or anywhere that dust proof bearing can be applied to advantage.

Having thus described my invention what I claim as new and desire to secure by Letters Patent is,

1. In a dust excluding mechanism of the class described the combination of a hub supporting bracket, an annular flange and a central projection formed integrally with said bracket, an annular groove located between the periphery of said flange and the projection, an outwardly diverging stationary collar rigidly secured at one end to said bracket within said groove, a collar retaining bolt located in and adapted to secure said collar and flange together, a revoluble collar supported upon said stationary collar, a disk blade rigidly fixed to the periphery of said revoluble collar, a dust cap rigidly secured to said revoluble collar, a washer carried by said revoluble collar, and means for retaining said washer against the vertical face of said stationary flange.

2. In a dust excluding mechanism of the class described, the combination of a hub supporting bracket, an annular flange a central projection formed integrally with said bracket, an annular groove located between the periphery of said flange and the projection, an outwardly diverging stationary collar rigidly secured at one end to said bracket within said groove, a collar retaining bolt located in and adapted to secure said collar and flange together, a revoluble collar supported upon said stationary collar, a disk blade rigidly fixed to the periphery of said revoluble collar, a dust cap rigidly secured to said revoluble collar, a washer carried by said revoluble collar, a spiral spring interposed between the revoluble collar and said washer and adapted by its recoil to retain said washer against the vertical face of said stationary flange, substantially as set forth.

In testimony whereof I affix my signature in the presence of two witnesses.

NICHOLAS R. NELSON.

Witnesses:
C. J. KALKHURST,
EDWARD BERIHL.